Patented July 29, 1947

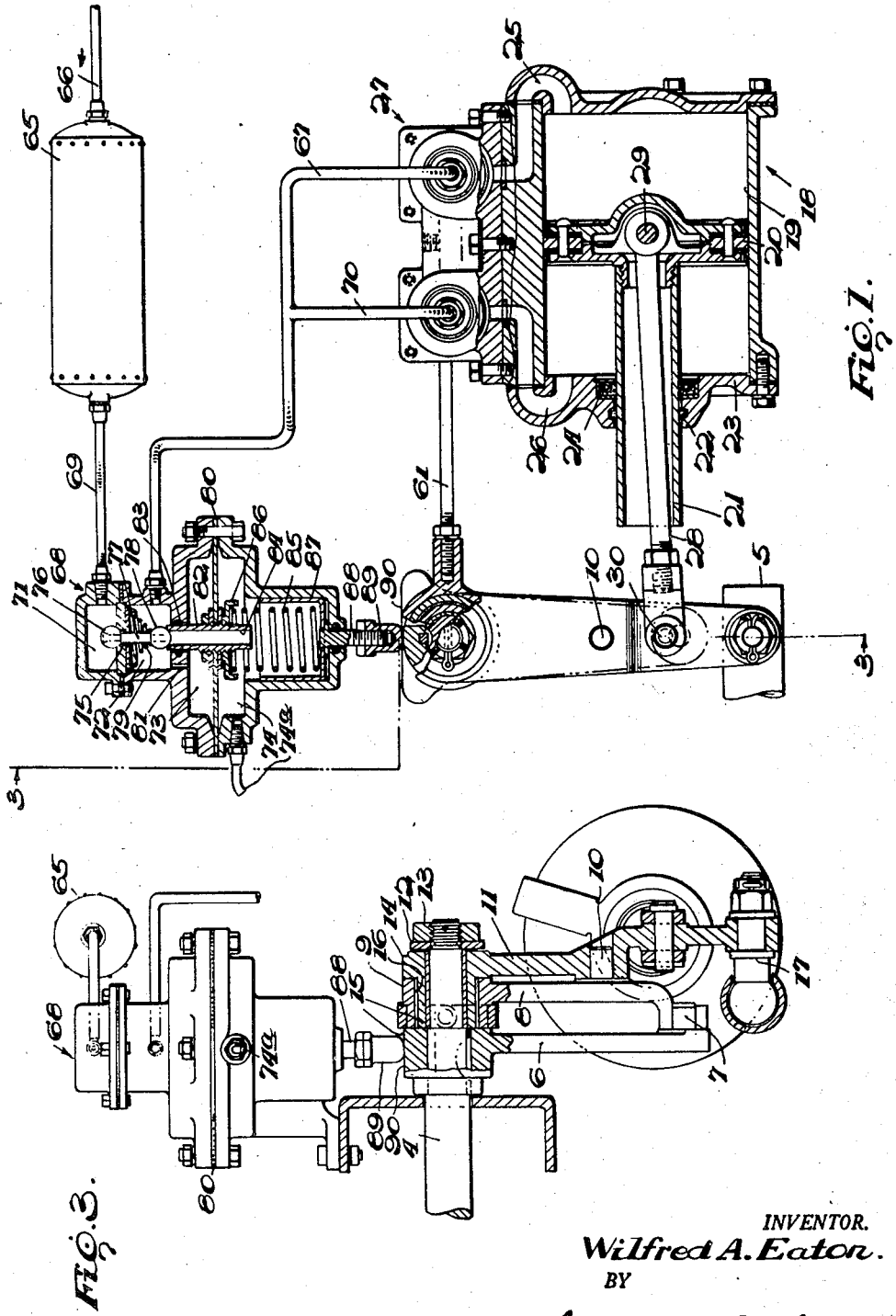

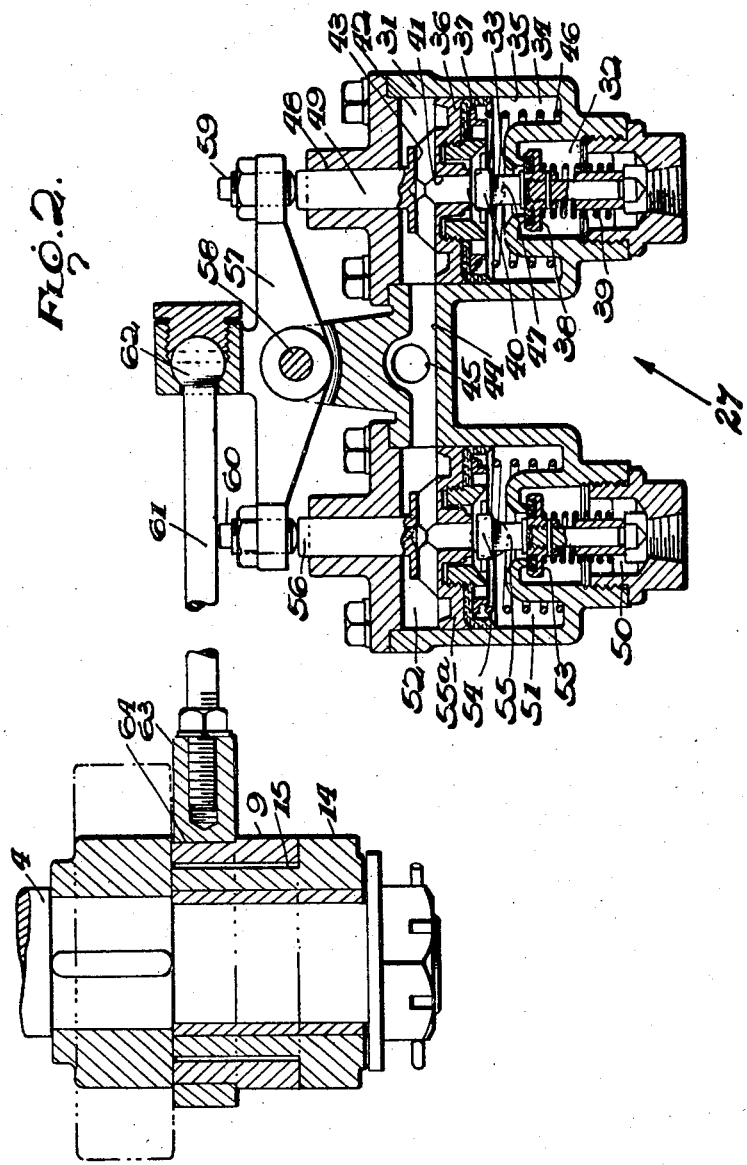

2,424,806

UNITED STATES PATENT OFFICE 2,424,806

FLUID PRESSURE CONTROL MECHANISM FOR VEHICLE STEERING GEAR

Wilfred A. Eaton, Elyria, Ohio, assignor to Bendix-Westinghouse Automotive Air Brake Company, Elyria, Ohio, a corporation of Delaware Application October 21, 1943, Serial No. 507,205

12 Claims. (Cl. 180—79.2)

This invention relates to fluid pressure control mechanism, and more particularly to power or fluid operated mechanism for steering road vehicles.

Mechanisms of the type generally illustrated in connection with the present invention have been previously utilized with considerable success, but difficulty has been encountered in some particular installations due to the tendency of the mechanism to set up a reciprocating or shimmy action of the steering wheels of the vehicle, and it is accordingly an object of the present invention to provide means for overcoming this difficulty.

It has also been found in connection with steering mechanisms of the above type, that the pressure of fluid supplied to the steering gear could be reduced to such a point as to minimize or entirely eliminate the reciprocating condition, and it is accordingly an object of the present invention to provide means for reducing the supply of pressure to the steering mechanism under certain conditions of operation.

Yet another object of the invention is to provide means controlled by the operation of the steering gear for automatically limiting the pressure of fluid supplied to the steering gear when the vehicle is moving in substantially a straight path in order to eliminate the undesired reciprocation.

Another object of the invention is to provide means for insuring an adequate supply of fluid pressure to the steering mechanism when the vehicle is turning.

A further object of the invention is to provide adjustable mechanism for limiting the pressure of fluid supplied to the steering gear to a desired value.

The above and other objects and novel features of the invention will appear more fully hereinafter from the following detailed description when taken in connection with the accompanying drawings, wherein there is illustrated one embodiment of the invention. It is to be expressly understood, however, that the drawings are employed for purposes of illustration only and are not designed as a definition of the limits of the invention, reference being had for this purpose to the appended claims.

Referring to the drawings wherein similar reference characters denote similar parts throughout the several views:

Fig. 1 is a side view, partially in section of a mechanism embodying the principles of the present invention;

Fig. 2 is a partial top view of some of the parts shown in Fig. 1, and illustrates the control valve operating mechanism utilized in the present invention, and Fig. 3 is a transverse sectional view of certain parts of the mechanism shown in Fig. 1.

Referring more particularly to Figs. 1 and 2, the present invention is illustrated therein as including a manually operable means or shaft 4, which may be rotated by any suitable operator-controlled means, not shown, and which is connected by means, hereinafter to be described in more detail, to a drag link 5 forming a part of the steering mechanism usually provided on motor vehicles, said drag link being suitably connected to the dirigible wheels of the motor vehicle by connections, not shown, in order to steer the latter in either direction.

A lever 6 is suitably secured to the shaft 4 for rotation therewith, the opposite end of the lever being pivotally connected by means of a pivot pin 7 with the lower end of an intermediate lever 8, the upper end of the lever 8 being provided with a hub portion 9 concentrically surrounding and spaced from the shaft 4. The intermediate lever is also connected by means of a pivot pin 10 with a power operated lever 11, which is mounted for rotation on the right end of the shaft 4, the lever being maintained in the position shown by means of a washer 12 and a suitable nut 13 carried on the end of the shaft. The upper end of the lever 11 is provided with a hub portion 14, and the left end of the hub is provided with a portion 15 of a smaller outside diameter than the diameter of a bore 16 formed in the hub 9, this arrangement thus permitting restricted pivotal movement of the lever 8 about the pivot pin 7. The lower end of the lever 11 is provided with a ball joint 17 which is connected with the drag link 5 in a conventional manner in order to impart motion thereto. Power operation of the lever 11 is provided, as shown more particularly in Fig. 1, by means of a fluid actuator 18 having a cylinder 19 and a piston 20 slidably mounted therein. The piston is provided on the left side with a tubular member 21 slidably mounted in a bore 22 formed in a cover plate 23 which serves to close the left end of the cylinder, leakage past the tubular member being prevented by means of a seal 24. The right and left ends of the cylinder are provided with fluid pressure supply passages 25 and 26 as shown, these passages being connected with a suitable control valve mechanism 27, as will be more fully described hereinafter. The piston is connected with the lever 11 by means of a suitable piston rod 28, the right end of the rod being connected with the piston by means of a pivot pin 29 and the left end being connected with the lever by means of a pivot pin 30.

The construction of the control valve 27 is more fully illustrated in Fig. 2, the valve mechanism comprising a casing 31, and since the right and left portions of the valve mechanism are identical as shown, only the right-hand portion will be described in detail. The casing is formed with an inlet chamber 32 provided with a port 33 leading to an outlet chamber 34. The outlet chamber is formed with a cylinder wall 35 having a piston 36 slidably mounted therein, the piston being provided with a suitable seal or cup 37 as shown in order to prevent leakage. Communication between the inlet chamber and outlet chamber is normally prevented by means of an inlet valve 38 normally maintained in port-closing position by means of a spring 39 interposed between the lower face of the valve and the casing, the upper end of the valve being provided with an exhaust valve member 40 arranged substantially in alignment with the inlet valve as well as with a bore 41 formed in the piston. The piston defines in connection with the casing, an exhaust chamber 42, and the bore 41 is connected with the chamber by means of ports 43 formed in the piston, the chamber in turn being connected with atmosphere by means of passage 44 and an exhaust port 45. The piston is normally urged in an upward direction by means of a spring 46, and it will be understood that on downward movement of the piston, the exhaust valve will first engage the lower end of the bore 41 preventing communication between the outlet chamber and the exhaust chamber, further downward movement of the piston serving to open the inlet valve in order to permit communication between the inlet and outlet chambers through the inlet port 33. An outlet port 47 is provided in the wall of the outlet chamber as indicated, and this port is connected with the port 25 leading to the right end of the cylinder 19 as illustrated in Fig. 1. The upper end of the casing is provided with a centrally located bore 48 adapted to slidably receive an operating stem 49 formed on the upper end of the piston. In like manner, the left-hand portion of the valve is provided with an inlet chamber 50, an outlet chamber 51, and an exhaust chamber 52 connected with the port 45 through the passage 44, inlet and exhaust valves 53 and 54 being positioned in the same manner as the valves 38 and 40 in the right side of the valve, and serving to control the flow of fluid pressure from the outlet chamber to the atmospheric port as well as from the inlet chamber to the outlet chamber. An outlet port 55 is provided in the wall of the outlet chamber 51 and is connected, as shown more fully in Fig. 1, with the port 26 leading to the left end of the cylinder 19. A piston 55a, identical in construction with the piston 36, is provided in the left-hand portion of the valve and is provided with an upwardly extending stem 56 for the purpose of operating the piston and valves. The piston stems 49 and 56 are operated by means of a rocker arm 57 pivotally mounted on the housing by means of a pivot pin 58, movement of the rocker arm in a clockwise direction about the pin 58 serving to depress the right-hand piston rod to prevent communication between chambers 34 and 42, and to permit communication between the inlet chamber 32 and the outlet chamber 34. In like manner, movement of the rocker arm in a counterclockwise direction will serve to move the piston 55a downward to operate the valves in order to prevent communication between the chambers 51 and 52 and permit communication between the chambers 50 and 51. With the rocker arm in neutral position, the valve mechanism is preferably so adjusted by means of adjusting screws 59 and 60 that the intake valves are both closed and the exhaust valves are both open as shown. Operation of the rocker arm is accomplished by means of a valve rod 61 connected with the rocker arm by means of a suitable ball joint 62, and connected at its left end with the upper end of the lever 8 by means of a bearing member 63 threadedly connected with the rod and mounted for rotation on a bearing portion 64 formed on the left side of the hub 9 as shown in Fig. 3.

Fluid pressure is supplied to the control valve mechanism 27 by means of a reservoir 65 adapted to be supplied with fluid pressure from a compressor, not shown, by means of a conduit 66. A supply conduit 67 leads from the inlet chamber of the right portion of the valve 27 to a control valve mechanism 68, to be described hereinafter, the control valve mechanism in turn being supplied with fluid pressure from the reservoir 65 through a conduit 69. The left hand inlet valve is supplied with fluid pressure from the conduit 67 by means of a conduit 70 interconnected therebetween.

In the event the operator desires to move the drag link to the left as viewed in Fig. 1, the shaft 4 is turned in a clockwise direction by means of the vehicle steering gear, not shown, whereupon the lower end of the lever 8 is moved to the left, the lever 8 accordingly tending to rotate in a clockwise direction about the pivot pin 10 which is pivotally mounted in the lever 11, movement of the lever 11 being opposed at this time by the drag link 5 connected to the steering wheels of the vehicle. Thus the lever 8 rotates in a clockwise direction about the pivot pin and the valve rod 61 is moved to the right rotating the beam 57 in a clockwise direction about the pivot pin 58 as viewed in Fig. 2 in order to depress the stem 49 and operate the valve mechanism to prevent communication between the outlet chamber 34 and the exhaust chamber 42 and to permit communication between the inlet chamber 32 and the outlet chamber, and since the outlet chamber is connected with the right side of the cylinder through the port 47 and the duct 25, fluid pressure will be supplied to the right end of the cylinder in order to force the piston to the left. When this action occurs, and assuming that the shaft 4 and lever 6 are now held in a stationary position by the operator, the movement of the lever 11 with respect to the lever 6 will cause the lever 8 to rotate in a counterclockwise direction about the pivot pin 7 in order to initiate movement of the valve actuating rod 61 to the left. This action will tend to permit closing of the inlet valve 38 in order to prevent the further flow of fluid pressure to the right end of the cylinder, and in the event the pressure in the right end of the cylinder tends to move the mechanism to a point beyond that necessary to close the inlet valve 38, further movement will open the exhaust valve 40 in order to permit the exhaust of excess pressure from the right end of the cylinder. Since the piston 36 is subjected at all times to the pressure in the outlet chamber 34, it will also be understood that during any condition of operation such that there is a positive pressure in the right side of the cylinder, for example, any further movement of the shaft 4 and lever 6 in a clockwise direction to supply additional fluid pressure to the right end of the cylinder will be opposed by a force proportional to the fluid pressure acting on the piston 36, in view of the fact that the latter is connected with the lever 6 through the mechanism above described. The operator is thus advised at all times of the relative force necessary to operate the steering gear, as more fully explained in the patent to Stephen Vorech and S. Johnson, Jr., No. 2,018,197, dated October 22, 1935.

During the operation of steering mechanisms of the above type, it has been found that the tendency toward reciprocation or shimmy has been most apparent when the vehicle was proceeding in a straight line, it was also further found in tests on this type of equipment that a reduction in the supply of pressure from the reservoir would tend to minimize or overcome this condition. Since the power required to steer the vehicle is at a minimum when the vehicle is moving in substantially a straight line, means are provided in the present invention for reducing the pressure of the fluid supplied to the steering mechanism when the dirigible wheels are in this position and for automatically increasing the pressure as the angle of turn increases, as it has been found that reciprocation does not occur when the dirigible wheels are turned at any substantial angle from the straight ahead position.

To this end the control mechanism 68 is provided with an inlet chamber 71, an outlet chamber 72, a diaphragm chamber 73 and an exhaust chamber 74 provided with an exhaust conduit 74a. The inlet and outlet chambers are connected by means of a port 75 formed in the casing, this port being normally closed by an inlet valve 76 provided with a downwardly extending stem 77 having an exhaust valve 78 at its lower end as shown. A valve spring 79 is interposed between the casing and the upper side of the exhaust valve in order to maintain the inlet valve in the above port-closing position. A flexible diaphragm 80 is carried by the housing as shown and serves to separate the exhaust chamber from the diaphragm chamber, the latter chamber being connected with the outlet chamber by means of a restricted port 81. The center portion of the diaphragm is provided with a tubular valve operating element 82 attached to the diaphragm as shown and slidably mounted in a bore 83 formed in the casing. The tubular element is provided with a bore 84, the upper end of this bore being adapted for communication with the outlet chamber 72 and the lower end being in communication with the exhaust chamber 74. The operation of the valve operating element 82 is controlled by means of a graduating spring 85 interposed between a washer 86 carried by the tubular member and a valve operating member 87 slidably mounted in the housing, the latter member being provided with a downwardly extending stem 88 having adjustable cam follower 89 threadedly mounted thereon and in abutment with the surface of a symmetrical cam 90 formed on the hub of the lever 6. The valve mechanism 68 is thus of the conventional self-lapping type, the operation being similar to that shown and described in the patent to William J. Andres and Roy S. Sanford No. 2,133,275, dated October 18, 1938, it being understood that with the parts in the position shown, the graduating spring 85 is so tensioned as to establish a pressure in the outlet chamber 72, and consequently in the inlet chambers of the valve mechanism 27, which is sufficient to provide for limited power operation of the steering mechanism without, however, being sufficient to permit the reciprocating condition to be set up. On rotation of the lever 6 in either direction from neutral position, however, the symmetrical cam 90 is so shaped that such movement immediately raises the follower 89 and the plunger 88 in order to increase the tension of the graduating spring, and thus to open the inlet valve 76 to permit an increase in the pressure in the outlet chamber 72 and in the inlet chambers of the steering gear control valve. The cam 90 may be shaped in any desired manner in order to vary the above pressure as required for any particular installation. It will be understood that if desired, the cam may be so proportioned as to control the operation of the control mechanism 68 so as to entirely cut off the supply of fluid pressure to the valve mechanism 27 when the parts are in the position shown, and it will also be understood that the cam may be designed so as to supply full pressure to the valve 27 as soon as the lever 6 is turned at a slight angle from neutral in either direction. When the lever 6 is again returned to neutral position, it will be clear that the tension of the graduating spring will be decreased whereupon the pressure in the diaphragm chamber 73 will tend to move the valve element downward to open the exhaust valve to allow the escape of fluid pressure until such time as the pressure acting downward again becomes sufficient to balance the force of the graduating spring acting in the other direction, whereupon a new condition of balance is established wherein the output pressure of the valve mechanism 68 is proportional to the tension of the graduating spring.

It will be apparent from the foregoing that novel means have been provided for automatically limiting the supply of fluid pressure to the control valves of the power steering gear to such a value that satisfactory power operation may be obtained without setting up the undesirable reciprocating condition. The member 89 may be readily adjusted to vary the pressure delivered by the valve 68 when the lever 6 is in neutral position, and the shape of the cam 90 may be varied as desired in order that the pressure obtained at various angles of turn of the lever 6 may be adjusted in accordance with the particular characteristics of the vehicle upon which the power steering mechanism is installed. It will therefore be understood that valve 68 serves to reduce the pressure from the supply 65 during operation of the system, and to control the application of such reduced pressure to the valve mechanism 27. Means have thus been provided for automatically eliminating or minimizing reciprocation or shimmy, while at the same time providing for the maximum power output of the steering mechanism at any angle of turn consistent with the shimmy characteristics of the particular vehicle involved.

While one embodiment only has been described and illustrated, it will be readily understood by those skilled in the art that various changes, substitutions, and rearrangements of the component parts may be resorted to without departing from the spirit of the invention. It will also be understood that mechanism in accordance with the principles set forth may be utilized in connection with other forms of power than fluid pressure in order to obtain the same operating characteristics. Reference will, therefore, be had to the appended claims for a definition of the limits of the invention.

What is claimed is:

1. The combination with a power steering gear for vehicles having a power operated member for steering the vehicle, a power actuator for said member, a manually operable member connected with said power operated member and adapted for limited movement relative thereto, and means controlled by relative movement of said members for controlling the supply of power to said actuator, of power controlling means controlled by movement of one of said members for limiting the force output of said actuator including means for varying the supply of power to said first named means in accordance with the movement of said one member.

2. The combination with a power steering gear for vehicles having a power operated member for steering the vehicle, a fluid actuator for said member, a manually operable member connected with said power operated member and adapted for limited movement relative thereto, and means including valve mechanism responsive to relative movement of said members for controlling the supply of fluid pressure to said actuator, of means for controlling the supply of fluid pressure to said valve mechanism including a valve having a connection with one of said members, and operable by movement thereof for varying the pressure of fluid supplied to said valve mechanism in accordance with the movement of said one member.

3. The combination with a power steering gear for vehicles having a power operated member for steering the vehicle, a fluid actuator for said member, a manually operable member connected with said power operated member and adapted for limited movement relative thereto, and means including valve mechanism responsive to relative movement of said members for controlling the supply of fluid pressure to said actuator, of means for controlling the pressure of fluid supplied to said valve mechanism including a valve for supplying fluid pressure to said valve mechanism, and means including a cam carried by one of said members for operating said valve for varying the pressure of fluid supplied to said valve mechanism in accordance with the movement of said one member.

4. The combination with a power steering gear for vehicles having a power operated member for steering the vehicle, a fluid actuator for said member, a manually operable member connected with said power operated member and adapted for limited movement relative thereto, and means including valve mechanism responsive to relative movement of said members for controlling the supply of fluid pressure to said actuator, of means for controlling the pressure of fluid supplied from a source of relatively high pressure to said valve mechanism including a reducing valve, a connection between said reducing valve and mechanism, and means carried by one of said members for operating said reducing valve to vary the pressure of fluid delivered from the source by the reducing valve and to said valve mechanism through said connection in accordance with the movement of said one member.

5. The combination with a power operated steering gear for vehicles having a power operated member having a neutral position and movable in either direction from neutral position to steer the vehicle in one direction or the other, a fluid actuator for said member, a manually operable member connected with said power operated member and adapted for limited movement relative thereto, and means including valve mechanism responsive to relative movement of said members for controlling the supply of fluid pressure to said actuator, of auxiliary means for controlling the supply of fluid pressure from a source of relatively high pressure to said valve mechanism including a reducing valve operable to normally supply fluid at a predetermined pressure to the valve mechanism, and means carried by one of said members for operating the reducing valve to supply fluid from said source to said valve mechanism at a pressure greater than said predetermined pressure whenever said one member is moved in either direction from neutral position.

6. The combination with a power steering gear for vehicles having a power operated member having a neutral position and movable in either direction from neutral position to steer the vehicle in one direction or the other, a fluid actuator for said member, a manually operable member connected with said power operated member and adapted for limited movement relative thereto, and means including valve mechanism responsive to relative movement of said members for controlling the supply of fluid pressure to said actuator, of means for controlling the supply of fluid pressure from a source of relatively high pressure to said valve mechanism including a reducing valve operable to normally supply fluid at a predetermined pressure to the valve mechanism, means for operating said reducing valve to increase the pressure of fluid supplied to said valve mechanism, and a cam carried by one of said members for actuating said operating means, whereby the pressure of fluid supplied from said source to said valve mechanism by the reducing valve is increased whenever said one member is moved in either direction from neutral position.

7. The combination with a power operated steering gear for vehicles having a power operated member for steering the vehicle, a fluid actuator for said member, a manually operable member connected with said power operated member and adapted for limited movement relative thereto, and means including valve mechanism responsive to relative movement of said members for controlling the supply of fluid pressure to said actuator, of means for controlling the supply of fluid pressure to said valve mechanism including a valve having a connection with one of said members and operable by movement thereof for varying the pressure of fluid supplied to said valve mechanism in accordance with the movement of said one member, and means for adjusting the valve to supply the valve mechanism with fluid at a predetermined pressure when said one member is in any selected position.

8. The combination with a power steering gear for a vehicle having a power operated member for controlling the angle of turn of the dirigible wheels of the vehicle, a power actuator for said member, a manually operable member connected with the power operated member and adapted for limited movement relative thereto, and power controlling mechanism responsive to relative movement of said members for controlling the supply of power to said actuator, of means for controlling the supply of power to said controlling mechanism including a device operated by one of said members for varying the amount of power supplied to the power controlling mechanism in accordance with the angle of turn of the dirigible wheels.

9. The combination with a power steering gear for a vehicle having a power operated member movable in opposite directions for steering the vehicle to the right or left of a straight path, a fluid actuator for moving the member in said opposite directions, and means including a movable control member and valve mechanism operated thereby for controlling the supply of fluid pressure to the actuator, of means for controlling the supply of fluid pressure to the control valve mechanism including a feed valve having adjusting means and adjustable for supplying fluid to the control valve mechanism at a predetermined pressure, and means controlled by movement of one of said members for varying the adjustment of said feed valve for correspondingly varying the pressure of fluid supplied to said control valve mechanism in accordance with movement of said one member.

10. The combination with a power steering gear for vehicles having a power operated member movable in opposite directions for steering the vehicle to the right or left of a straight path, a power actuator for moving said member in said opposite directions, and means including a movable control member for controlling the supply of power to said actuator, of auxiliary means for limiting the force output of said actuator including a device controlled by the operation of one of said members for limiting the amount of power supplied to the first named means in accordance with the movement of said one member.

11. The combination with a power steering gear for vehicles having a power operated member movable in opposite directions for steering the vehicle to the right or left of a straight path, a fluid actuator for moving said member in said opposite directions, and means including a movable control member and control valve mechanism operated thereby for controlling the supply of fluid pressure to the actuator, of means for limiting the pressure of fluid supplied to the actuator in accordance with the angle of turn of the vehicle including a control valve actuated by movement of one of said members for correspondingly limiting the pressure of fluid supplied to said actuator by the operation of said control valve mechanism.

12. The combination with a power steering gear for vehicles having a member for steering the vehicle, a power actuator for the member, a control member for controlling the operation of the steering gear having a lost motion connection with the first named member, and means controlled by relative movement of the members for controlling the supply of power to the actuator, of means for controlling the supply of power to the first named means including power controlling means having a connection with one of the members and controlled directly by movement of said one member.

WILFRED A. EATON.

REFERENCES CITED

The following references are of record in the file of this patent:

UNITED STATES PATENTS

| Number | Name | Date |
|---|---|---|
| 2,062,485 | Turek | Dec. 1, 1936 |
| 2,139,391 | Tibbetts | Dec. 6, 1938 |
| 378,980 | Schlesinger | Mar. 6, 1888 |
| 1,835,686 | Allan et al. | Dec. 8, 1931 |
| 2,367,194 | Boldt | Jan. 16, 1945 |

FOREIGN PATENTS

| Number | Country | Date |
|---|---|---|
| 19,980 | Great Britain | Sept. 23, 1908 |
| 181,402 | Great Britain | June 12, 1922 |